(12) United States Patent
Kano

(10) Patent No.: US 8,976,276 B2
(45) Date of Patent: Mar. 10, 2015

(54) IMAGE PROCESSING APPARATUS, IMAGE CAPTURING APPARATUS, AND IMAGE PROCESSING METHOD

(71) Applicant: Canon Kabushiki Kaisha, Tokyo (JP)

(72) Inventor: Masaaki Kano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 13/858,255

(22) Filed: Apr. 8, 2013

(65) Prior Publication Data

US 2013/0265461 A1 Oct. 10, 2013

(30) Foreign Application Priority Data

Apr. 10, 2012 (JP) .................. 2012-089691

(51) Int. Cl.
| | | |
|---|---|---|
| H04N 5/76 | (2006.01) | |
| H04N 9/083 | (2006.01) | |
| H04N 3/14 | (2006.01) | |
| H04N 5/335 | (2011.01) | |
| H04N 9/04 | (2006.01) | |
| G06T 3/40 | (2006.01) | |

(52) U.S. Cl.
CPC ............. *G06T 3/4007* (2013.01); *G06T 3/4015* (2013.01)
USPC ....................... 348/280; 348/231.6

(58) Field of Classification Search
CPC ........ H04N 5/3458; H04N 9/045; H04N 9/07
USPC .......................... 348/231.99, 231.6, 273, 280
See application file for complete search history.

(56) References Cited

U.S. PATENT DOCUMENTS

| | | | |
|---|---|---|---|
| 6,747,693 B1 | 6/2004 | Yamashita et al. | |
| 7,417,670 B1 * | 8/2008 | Linzer et al. | ............... 348/222.1 |
| 8,107,775 B2 * | 1/2012 | Onomura | ...................... 382/300 |
| 8,223,231 B2 * | 7/2012 | Tanizoe | ........................ 348/272 |
| 2014/0009655 A1 * | 1/2014 | Hayashi | ....................... 348/302 |

FOREIGN PATENT DOCUMENTS

| | | |
|---|---|---|
| JP | 2000-261793 A | 9/2000 |
| JP | 2011-211553 A | 10/2011 |

* cited by examiner

*Primary Examiner* — Daniel M Pasiewicz
(74) *Attorney, Agent, or Firm* — Canon USA Inc. IP Division

(57) ABSTRACT

When various reverse operations are performed using a scan reverse function that reverses an image vertically or horizontally, there is a problem in that color information of the first pixel of an image after being reversed is different from color information of the first pixel of a Bayer image before interpolation processing. An image processing apparatus performs interpolation processing on a first image of a Bayer pattern, generates a second image in which colors are arranged in an order reverse to the predetermined order from an interpolated image, and stores the second image in a memory. The image processing apparatus reverses the second image when reading the second image from the memory.

12 Claims, 8 Drawing Sheets

IMAGE PROCESSING APPARATUS, IMAGE CAPTURING APPARATUS, AND IMAGE PROCESSING METHOD

BACKGROUND OF THE INVENTION

1. Field of the Invention

The present disclosure generally relates to image processing and, more particularly, to a generation process and a reverse process of a Bayer image in an image processing apparatus.

2. Description of the Related Art

In recent years, images corresponding to full high definition (HD) with an image size of 1920 (horizontal (H))×1080 (vertical (V)) are used in television broadcast and the like. Further, recently, to generate a video work with a definition higher than that of the full HD image, in particular in the movie industry and the like, an image capturing apparatus is desired which can record an image with a definition higher than that of the full HD image, such as an Over HD image (for example, 4K horizontal×2K vertical: K=1000).

Therefore, to realize the image capturing apparatus described above, a complementary metal-oxide-semiconductor (CMOS) sensor having pixels, the number of which corresponds to 4K horizontal×2K vertical, is used in the image capturing apparatus. As the CMOS sensor, one having a Bayer structure, in which color filters of four colors (R/Gr/Gb/B) are arranged in a checkered pattern, may be used (the four colors (R/Gr/Gb/B) refer to colors including red (R), green next to the R in one direction of a pixel array (Gr), blue (B), and green next to the B in the one direction (Gb)). Therefore, an output signal from the CMOS sensor is a video signal of the Bayer structure, so that a white balance correction, a defect correction, and a correction of decrease in marginal illumination are performed on the video signal, and thereafter, a video signal of one frame (for example, 1/60 second) is recorded in a memory such as synchronous dynamic random access memory (SDRAM) or the like. The recorded video is further recorded in an external recording device through a 3 Gbps Serial Digital Interface (3G-SDI) transmission path by using a transmission standard compliant with Society of Motion Picture and Television Engineers (SMPTE). The following flow is applied to images recorded in the external recording device by using a personal computer (PC): an interpolation process is performed on a Bayer image of 4K×2K to generate a RGrGbB image with a size of 4K×2K and video signal processing such as color processing and edge enhancement is performed on the RGrGbB image to generate a final video signal of 4K×2K.

When generating a three dimensional (3D) image, a mirror for making a mirror image of an image of one of two image capturing apparatuses and the two image capturing apparatuses are used, so that an image output from one image capturing apparatus and an image output from the other image capturing apparatus are matched to each other vertically or horizontally. Therefore, the image capturing apparatus is required to have a scan reverse function to reverse an image. Japanese Patent Application Laid-Open No. 2000-261793 discloses a configuration to realize the scan reverse that is a function to reverse an image. When image data is read from a frame memory which temporarily stores an output image from an image capturing element, a memory that indicates a sequence of reading image data is controlled, so that an image in the frame memory is freely reversed vertically, horizontally, or vertically and horizontally. Thereby, an image reversal can be changed freely by the control for reading image data from the frame memory. However, in the Bayer image which is an output image from the image capturing element, color filters (R/Gr/Gb/B) are arranged in a checkered pattern, so that there is a problem in that a color signal of a first pixel of the Bayer image before reversing the image is different from a color signal of a first pixel of the Bayer image after reversing the image. In this case, when performing various signal processing operations (false color processing, edge enhancement, and band limitation for each color) on the Bayer image output from the image capturing apparatus by using external editing application software, a first pixel of the image is changed to another color signal. Therefore, if signal processing is performed assuming that a color of the color signal of the first pixel of the recorded Bayer image corresponds to a color of the color signal of the first pixel of the Bayer image output from the CMOS sensor, there is a problem in that an LPF that limits the band of each color and the false color processing do not function properly, and the image quality may degrade.

SUMMARY OF THE INVENTION

An aspect of the present disclosure is to provide an image processing apparatus including a generation unit configured to perform interpolation processing on a first image in which a plurality of colors is arranged in a predetermined order and generate a second image in which colors are arranged in an order reverse to the predetermined order from an interpolated image, a memory configured to store the second image, and a reversing unit configured to reverse the second image when reading the second image from the memory.

Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the present disclosure and, together with the description, serve to explain the principles of the present disclosure.

DESCRIPTION OF THE EMBODIMENTS

Hereinafter, embodiments of the present disclosure will be described in detail with reference to the drawings.

Figure 1:
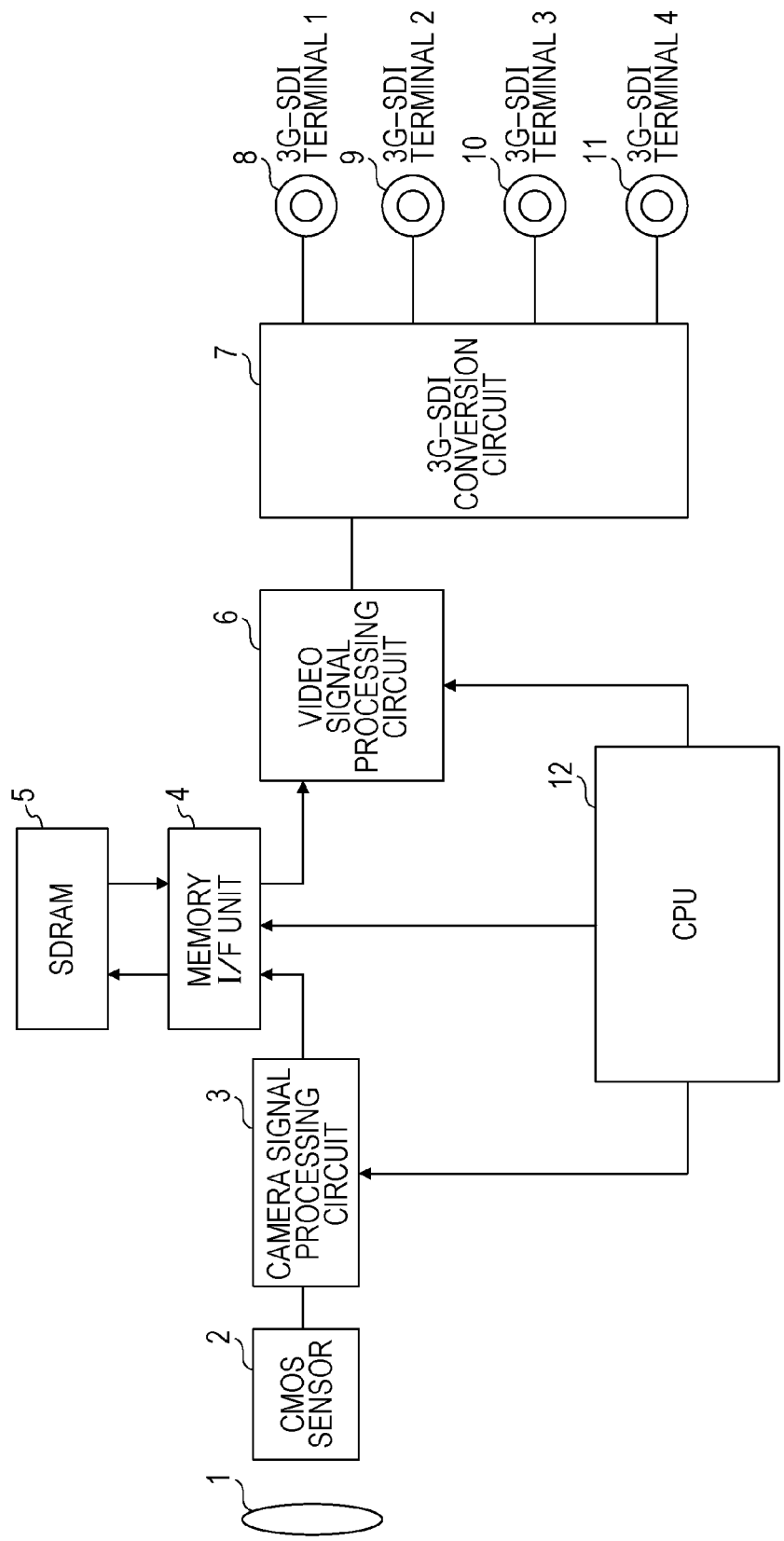
FIG. 1 is a diagram of a configuration example of an image capturing apparatus according to an embodiment of the present disclosure.

FIG. 1 is a block diagram showing an image capturing apparatus according to an embodiment of the present disclosure. The image capturing apparatus includes a lens which forms an image capturing unit that captures an image of an object and a CMOS sensor which is an image capturing element that converts incident light from the lens into an electric signal.

Figure 3:
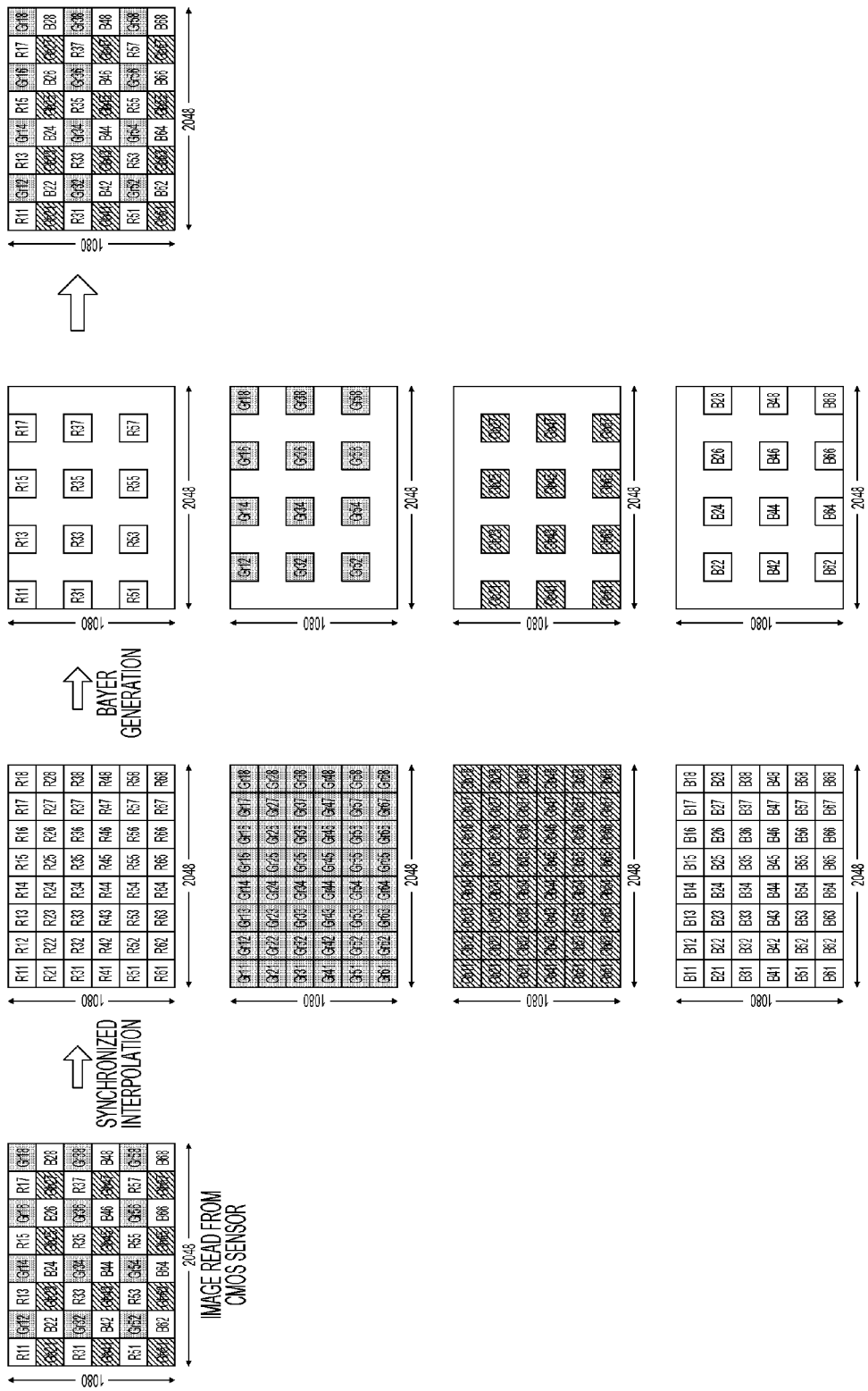
FIG. 3 is a diagram of an example of Bayer image generation when "scan reverse is OFF" in the image capturing apparatus according to an embodiment of the present disclosure.

Here, as shown in FIG. 3, a color filer structure of the CMOS sensor has a Bayer structure in which an R pixel, a Gr pixel, a Gb pixel, and a B pixel are arranged in a checkered pattern.

The image capturing apparatus also includes a line memory and an interpolation processing circuit for performing a white balance correction and interpolation processing on an output signal from the CMOS sensor, a color matrix operating circuit for performing color adjustment, and a camera signal processing circuit for generating a Bayer image.

Thereby, a color matrix operation is performed on an interpolated image (R/Gr/Gb/B) obtained by interpolating a Bayer image and thereafter one color signal of each pixel is selected from the interpolated image, so that a Bayer image is generated.

The generated Bayer image is written to an SDRAM that forms the frame memory through a memory I/F unit and further the written image data is read so that the image data is compliant with an output format. Thereafter, a signal conversion is performed so that the signal is compliant with a 3G-SDI standard that is the output format, and then the Bayer image data is output from the 3G-SDI that is an output terminal included in the image capturing apparatus.

FIG. 1 is a diagram to which the present disclosure is applied. First, the image capturing apparatus according to an embodiment of the present disclosure will be described with reference to FIGS. 1 and 2.

First Embodiment

In FIG. 1, an optical signal having passed through a lens 1 is input into a CMOS sensor 2. The CMOS sensor 2 converts the optical signal into an electrical signal and then outputs the electrical signal to a camera signal processing circuit 3 as image data. Here, color absorbers attached to the upper surface of micro lenses in the CMOS sensor are "R (absorption wavelength is 600 nm to 700 nm) that absorbs red", "Gr or Gb (absorption wavelength is 500 nm to 600 nm) that absorbs green", and "B (absorption wavelength is 400 nm to 500 nm) that absorbs blue". The color absorbers have a "Bayer structure" in which the color absorbers are arranged in a checkered pattern (see FIG. 3). For example, the number of pixels included in the CMOS sensor 2 is 2K (2048) horizontal×1K (1080) vertical (R pixels=Gr pixels=Gb pixels=B pixels=1024×540).

The camera signal processing circuit 3 re-generates a Bayer image from a white balance correction circuit, a line memory for interpolation processing, an interpolation processing circuit, a color matrix correction, and an interpolated image after the matrix correction, and outputs image data of the re-generated Bayer image to a memory interface (I/F) unit 4. The memory I/F unit 4 performs write control of the image data to an SDRAM 5 that buffers an image and further performs read control so that the buffered image is compliant with an output format. A video signal processing circuit 6 reads the image data written to the SDRAM 5, re-arranges the image data into a signal arrangement compliant with the SMPTE standard, and then outputs the image data to a 3G-SDI conversion circuit 7. The 3G-SDI conversion circuit 7 converts a signal so that the signal corresponds to a SMPTE standard format that standardizes the 3G-SDI standard and then outputs the signal to 3G-SDI terminals 8 to 11 which are 3G-SDI output terminals.

A central processing unit (CPU) 12 outputs image reversal information when a "scan reverse" mode included in a menu function of the image capturing apparatus is selected to the camera signal processing circuit 3 and the memory I/F unit 4 as a signal.

Figure 2:
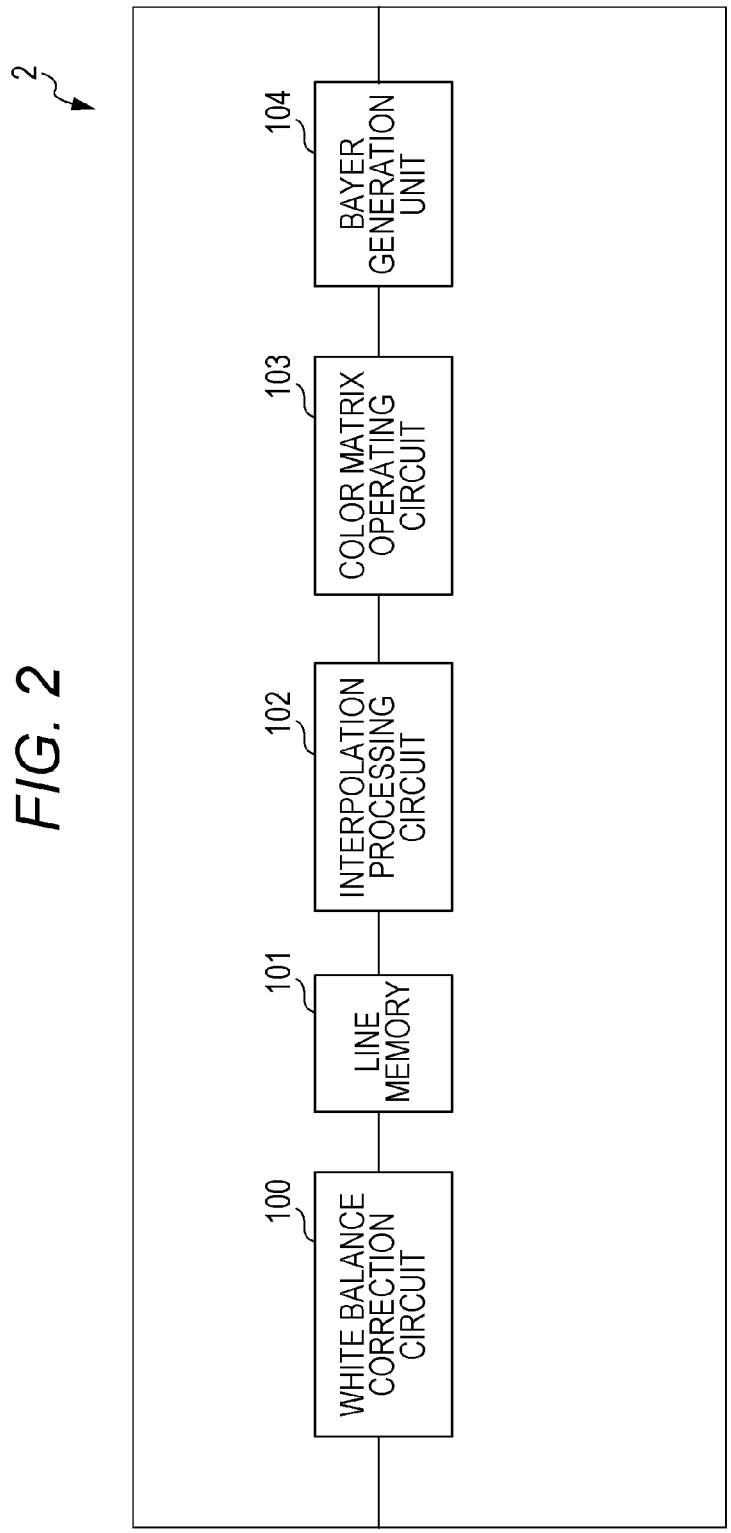
FIG. 2 is a diagram of a configuration example of a camera signal processing circuit in the image capturing apparatus according to an embodiment of the present disclosure.

Next, a process of the camera signal processing circuit 3 in FIG. 1 will be described with reference to FIG. 2. A configuration example of the camera signal processing circuit 3 of the present embodiment is a configuration shown in FIG. 2. An output signal from the CMOS sensor 2 is input into a white balance correction circuit 100. The white balance correction circuit 100 adjusts a gain of each of R, G, and B color signals so that a ratio of R, G (Gr and Gb), and B is 1:1:1 when the image capturing apparatus captures a "white image", for example. A Bayer image where the gains of R, G, and B color signals have been adjusted is input into a line memory 101. The line memory 101 forms a line memory for an interpolation processing circuit 102 to perform synchronized interpolation processing, in particular, interpolation processing in the vertical direction. For example, when the interpolation processing is performed on 11 taps in the vertical direction, a line memory for 10 lines is provided for each color (R/Gr/Gb/B).

Output signals from each line memory are output to the interpolation processing circuit 102. The interpolation processing circuit 102 performs the interpolation processing on each pixel to generate all color signals of R, G, and B (color signals of G and B are generated by the interpolation processing at a position of an R pixel). Here, for example, the interpolation processing circuit 102 includes 11 lines in the vertical direction×11 pixels in the horizontal direction. As shown in FIG. 3, the size of the image of each color after the interpolation processing is R=Gr=Gb=B=2048 horizontal×1080 vertical).

Each image after the interpolation processing is output to a color matrix operating circuit 103. The color matrix operating circuit 103 performs a matrix operation including three rows and three columns as shown by the formula (1) below in order to correct color variation due to variation of color filters included in the CMOS sensor 2.

[Formula 1]

$$\begin{bmatrix} r \\ g \\ b \end{bmatrix} = \begin{bmatrix} a & b & c \\ d & e & f \\ g & h & i \end{bmatrix} \begin{bmatrix} R \\ G \\ B \end{bmatrix} \quad (1)$$

Here, coefficients are set so that a+b+c=d+e+f=g+h+i=1 is satisfied.

Operation expressions of each pixel are represented as below.

$$r = a*R + b*G + c*B \quad (2)$$

$$g = d*R + e*G + f*B \quad (3)$$

$$b = g*R + h*G + i*B \quad (4)$$

An image after the matrix operation of three rows and three columns is a signal obtained by multiplying each of R, Gr, Gb, and B images by the matrix coefficients and summing up the multiplication results (formulas (2) to (4)). Color signals of each of R, Gr, Gb, and B are output to a Bayer generation unit 104.

The Bayer generation unit 104 selects and outputs a color signal corresponding to a Bayer pattern of the CMOS sensor at each pixel. For example, in the case of an R pixel, an r pixel subjected to the matrix operation is selected. In the case of a Gr pixel, a g pixel subjected to the matrix operation is selected. In the case of a Gb pixel, a g pixel subjected to the matrix operation is selected. In the case of a B pixel, a b pixel subjected to the matrix operation is selected. Here, selection information for selecting a color signal corresponding to the Bayer pattern of the CMOS sensor is generated on the basis of output information from the CPU 12 shown in FIG. 1. The Bayer image generated by the Bayer generation unit 104 is output to the memory I/F unit 4.

Next, a signal flow in which a Bayer image is generated from the Bayer image of the CMOS sensor 2 by the Bayer generation unit 104 through the interpolation processing circuit 102 will be described in detail with reference to FIG. 3.

The Bayer image read from the CMOS sensor is an image in which R, Gr, Gb, and B are arranged in a checkered pattern.

Therefore, when the image size of the Bayer image is 2048 horizontal×1080 vertical, each image size of each pixel (R/Gr/Gb/B) is 1024 horizontal×540 vertical.

In the Bayer image, the interpolation processing is performed by the interpolation processing circuit so that all the color signals of R/Gr/Gb/B are present at each pixel.

Therefore, each image size of each pixel (R/Gr/Gb/B) becomes 2048 horizontal×1080 vertical.

In images of each color (R/Gr/Gb/B) generated by the interpolation, the Bayer generation unit 104 performs a selection operation from R/Gr/Gb/B information in a pixel on the basis of the selection information from the CPU 12 included in the image capturing apparatus and outputs selected information.

For example, although there are R11, Gr11, Gb11, and B11 at an address 11 after the interpolation processing, a color signal of R11 is selected.

Although there are R12, Gr12, Gb12, and B12 at an address 12 after the interpolation processing, a color signal of Gr12 is selected.

Although there are R21, Gr21, Gb21, and B21 at an address 21 after the interpolation processing, a color signal of Gb21 is selected.

Although there are R22, Gr22, Gb22, and B22 at an address 22 after the interpolation processing, a color signal of B22 is selected.

The above operation is repeatedly performed, so that pixels having a color signal of R are present only at odd addresses in the horizontal direction, such as the address 11, the address 13, and so on, and also present only at odd addresses in the vertical direction, such as the address 11, the address 31, and so on.

Similarly, pixels having a color signal of Gr are present at even addresses in the horizontal direction and present at odd addresses in the vertical direction. Pixels having a color signal of Gb are present at odd addresses in the horizontal direction and present at even addresses in the vertical direction. Pixels having a color signal of B are present at even addresses in the horizontal direction and present at even addresses in the vertical direction.

An image of Bayer structure is re-generated by combining the above pixels.

As described above, the Bayer generation of this operation is performed on the basis of the control information from the CPU 12. Next, an operation of the Bayer generation unit 104 in an "up/down reverse mode" which is a function of the scan reverse and an up/down reverse operation performed by the memory I/F unit 4 will be described.

The operation for performing the interpolation processing on the Bayer image read from the CMOS sensor to generate an interpolated image is the same as the operation described above, so that the description thereof will be omitted.

Figure 4:
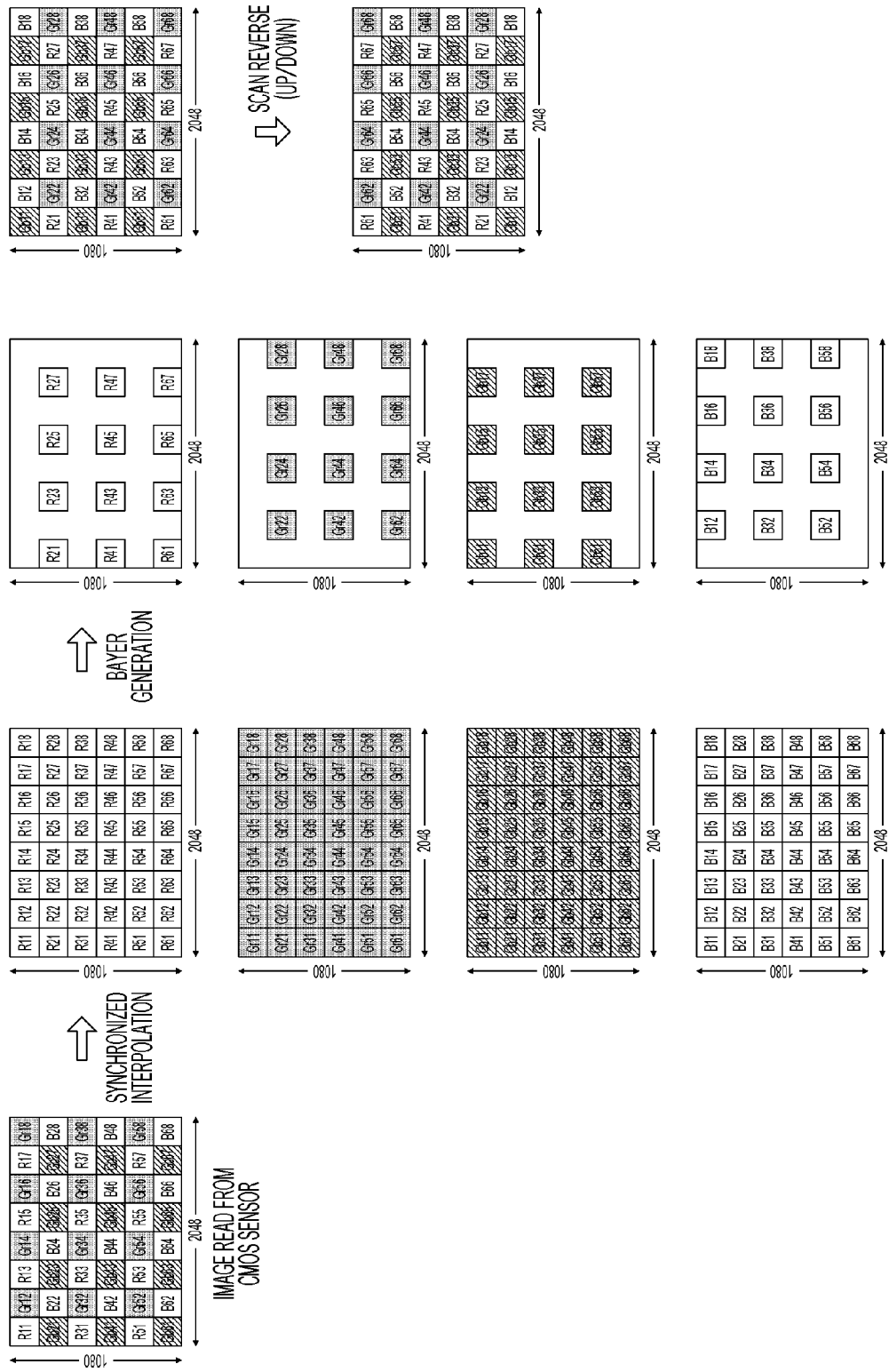
FIG. 4 is a diagram of an example of Bayer image generation when "scan reverse is ON" and an image reversal (up/down) in the image capturing apparatus according to an embodiment of the present disclosure.

As shown in FIG. 4, in the last line of the Bayer image from the CMOS sensor, pixels having a color signal of Gb and pixels having a color signal of B are alternately arranged. Therefore, a control signal is output from the CPU 12 to the Bayer generation unit 104 so that interpolation pixels corresponding to color signals of pixels in the last line in each column are selected in the first line in the interpolated image generated after the interpolation processing.

The Bayer generation unit 104 generates a Bayer image on the basis of this information. An operation to generate a Bayer image from actual interpolated images will be described based on FIG. 4.

Although there are R11, Gr11, Gb11, and B11 at the address 11 after the interpolation processing, a color signal of Gb11 is selected.

Although there are R12, Gr12, Gb12, and B12 at the address 12 after the interpolation processing, a color signal of B12 is selected.

Although there are R21, Gr21, Gb21, and B21 at the address 21 after the interpolation processing, a color signal of R21 is selected.

Although there are R22, Gr22, Gb22, and B22 at the address 22 after the interpolation processing, a color signal of Gr22 is selected.

The above operation is repeatedly performed, so that pixels having a color signal of Gb are present only at odd addresses in the horizontal direction, such as the address 11, the address 13, and so on, and also present only at odd addresses in the vertical direction, such as the address 11, the address 31, and so on.

Similarly, pixels having a color signal of B are present at even addresses in the horizontal direction and present at odd addresses in the vertical direction. Pixels having a color signal of R are present at odd addresses in the horizontal direction and present at even addresses in the vertical direction. Pixels having a color signal of Gr are present at even addresses in the horizontal direction and present at even addresses in the vertical direction.

An image of Bayer structure is re-generated by combining the above pixels.

By the above operation, a color signal of the first pixel of the Bayer image generated by the Bayer generation unit 104 is "Gb".

The Bayer image generated by the Bayer generation unit 104 is output to the memory I/F unit 4 and the Bayer generation unit 104 reverses the image vertically and writes the image data to the SDRAM 5 that buffers an image.

As a result, the first pixel (upper left pixel) of the Bayer image written to the SDRAM is R61 and the last pixel (lower right pixel) is B18.

Thereby, an image that is reversed vertically compared with the Bayer image input into the interpolation processing circuit 102 is obtained, and further the color signal of the first pixel (upper left pixel) of the Bayer image that is reversed vertically is "R" which is the same as the color signal of the first pixel of the Bayer image input into the interpolation processing circuit 102.

The above operation is an operation to reverse the image vertically. Next, an operation to reverse the image horizontally will be described with reference to FIG. 5.

Figure 5:
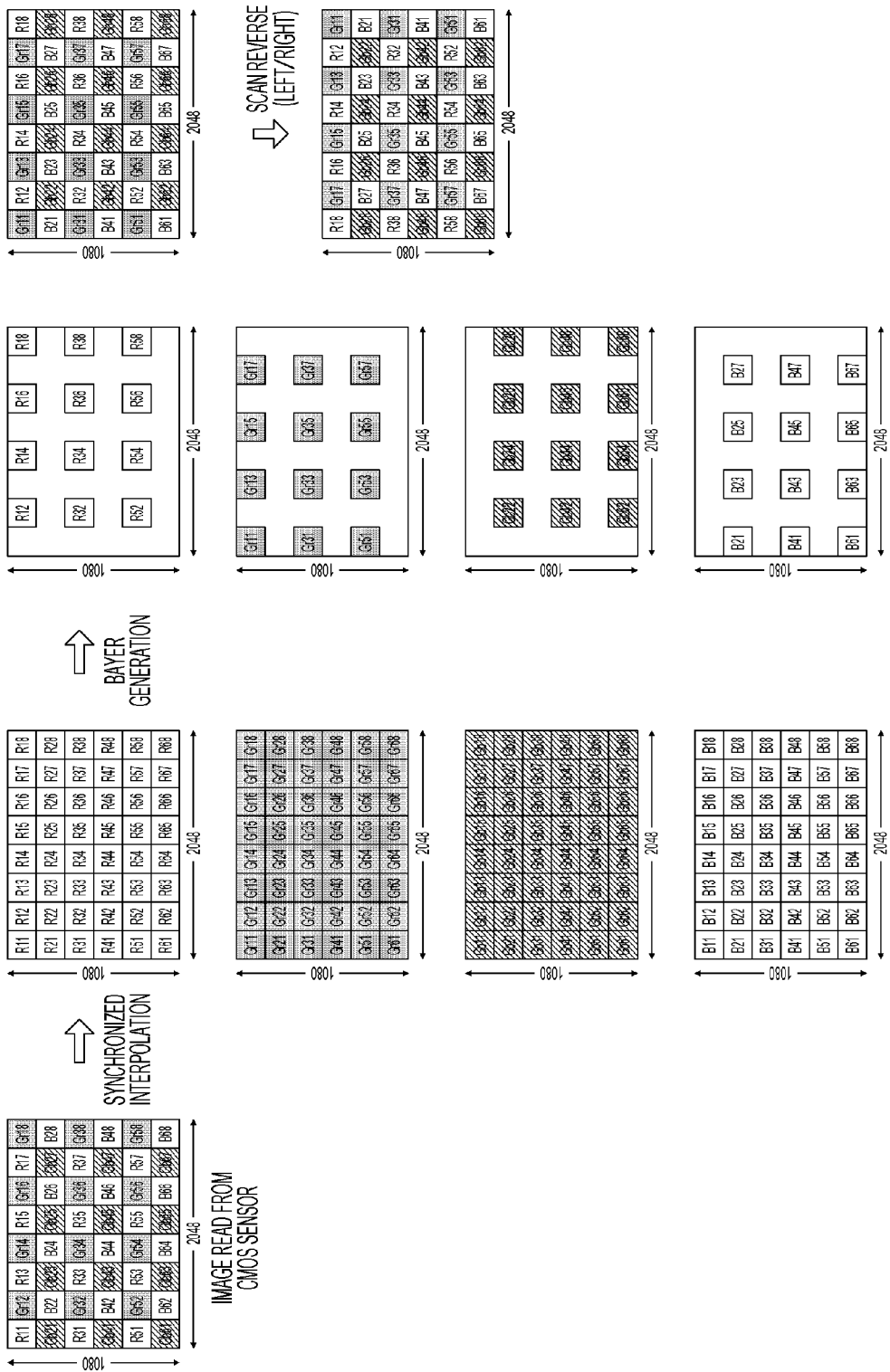
FIG. 5 is a diagram of an example of Bayer image generation when "scan reverse is ON" and an image reversal (left/right) in the image capturing apparatus according to an embodiment of the present disclosure.

As shown in FIG. 5, in the last column of the Bayer image output from the CMOS sensor, pixels having a color signal of Gr and pixels having a color signal of B are alternately arranged. Therefore, a control signal is output from the CPU 12 to the Bayer generation unit 104 so that interpolation pixels corresponding to color signals of pixels in the last column in each row are selected in the first column in the interpolated image generated after the interpolation processing.

Although there are R11, Gr11, Gb11, and B11 at the address 11 after the interpolation processing, a color signal of Gr11 is selected.

Although there are R12, Gr12, Gb12, and B12 at the address 12 after the interpolation processing, a color signal of R12 is selected.

Although there are R21, Gr21, Gb21, and B21 at the address 21 after the interpolation processing, a color signal of B21 is selected.

Although there are R22, Gr22, Gb22, and B22 at the address 22 after the interpolation processing, a color signal of Gb22 is selected.

The above operation is repeatedly performed, so that pixels having a color signal of Gr are present only at odd addresses in the horizontal direction, such as the address 11, the address 13, and so on, and also present only at odd addresses in the vertical direction, such as the address 11, the address 31, and so on.

Similarly, pixels having a color signal of R are present at even addresses in the horizontal direction and present at odd addresses in the vertical direction. Pixels having a color signal of B are present at odd addresses in the horizontal direction and present at even addresses in the vertical direction. Pixels having a color signal of Gb are present at even addresses in the horizontal direction and present at even addresses in the vertical direction.

An image of Bayer structure is re-generated by combining the above pixels.

By the above operation, a color signal of the first pixel of the Bayer image generated by the Bayer generation unit 104 is "Gr".

The Bayer image generated by the Bayer generation unit 104 is output to the memory I/F unit 4 and the Bayer generation unit 104 reverses the image horizontally and writes the image data to the SDRAM 5 that buffers an image.

As a result, the first pixel (upper left pixel) of the Bayer image written to the SDRAM is R18 and the last pixel (lower right pixel) is B61.

Thereby, an image that is reversed horizontally compared with the Bayer image input into the interpolation processing circuit 102 is obtained, and further the color signal of the first pixel (upper left pixel) of the Bayer image that is reversed horizontally is "R" which is the same as the color signal of the first pixel of the Bayer image input into the interpolation processing circuit 102.

The operations described above are an operation of "up/down reverse" and an operation of "left/right reverse".

Figure 6:
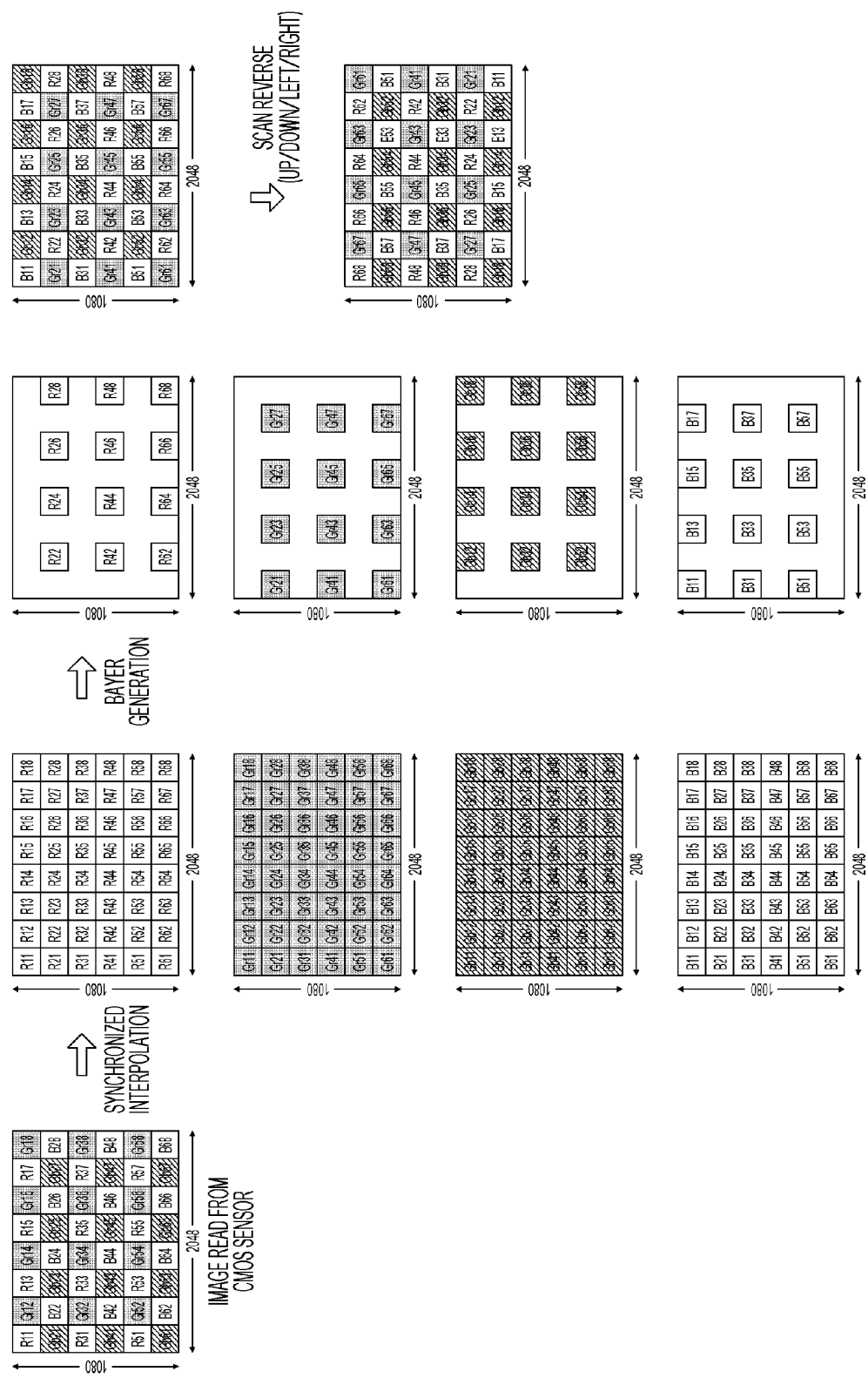
FIG. 6 is a diagram of an example of Bayer image generation when "scan reverse is ON" and an image reversal (up/down/left/right) in the image capturing apparatus according to an embodiment of the present disclosure.

Next, an operation of "up/down/left/right reverse" will be described with reference to FIG. 6. The operation of "up/down/left/right reverse" is basically the combination of the "up/down reverse" and the "left/right reverse".

Therefore, pixels having a color signal of B are present only at odd addresses in the horizontal direction, such as the address 11, the address 13, and so on, and also present only at odd addresses in the vertical direction, such as the address 11, the address 31, and so on.

Similarly, pixels having a color signal of Gb are present at even addresses in the horizontal direction and present at odd addresses in the vertical direction. Pixels having a color signal of Gr are present at odd addresses in the horizontal direction and present at even addresses in the vertical direction. Pixels having a color signal of R are present at even addresses in the horizontal direction and present at even addresses in the vertical direction.

An image of Bayer structure is re-generated by combining the above pixels.

By the above operation, a color signal of the first pixel of the Bayer image generated by the Bayer generation unit 104 is "B".

The Bayer image generated by the Bayer generation unit 104 is output to the memory I/F unit 4 and the Bayer generation unit 104 reverses the image vertically and horizontally and writes the image data to the SDRAM 5 that buffers an image.

As a result, the first pixel (upper left pixel) of the Bayer image written to the SDRAM is R68 and the last pixel (lower right pixel) is B11.

Thereby, an image that is reversed vertically and horizontally compared with the Bayer image input into the interpolation processing circuit 102 is obtained, and further the color signal of the first pixel (upper left pixel) of the Bayer image that is reversed horizontally is "R" which is the same as the color signal of the first pixel of the Bayer image input into the interpolation processing circuit 102.

As described above, in each of the "up/down reverse", the "left/right reverse", and the "up/down/left/right reverse" included in the image capturing apparatus, pixels selected from the pixels having color signals of interpolation R, Gr, Gb, and B are switched from the CPU 12 when the Bayer image is generated from the interpolated image after the interpolation processing.

Further, each reverse operation is performed in the memory I/F unit 4 that performs control of writing image data to the SDRAM 5, so that even when a reverse operation is performed, it is possible to match the color of the color signal of the first pixel of the Bayer image after the reverse operation with the color of the color signal of the first pixel of the Bayer image before the interpolation processing.

Here, the color signal of the first pixel after each reverse operation can be included in image data as camera metadata in the video signal processing circuit 6, so that the operations described above may be selectable.

Figure 8:
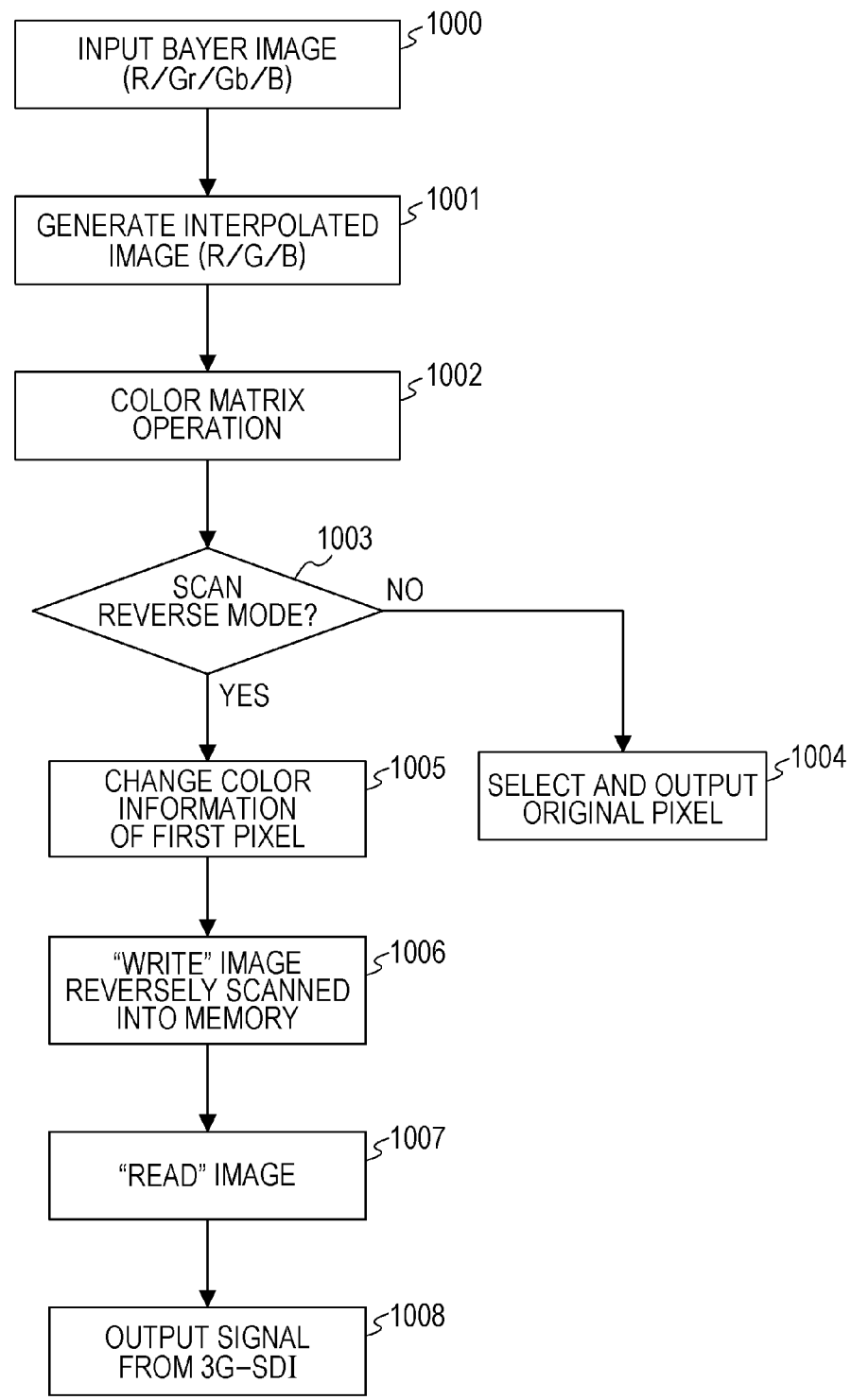
FIG. 8 is a flowchart of an example of an operation flow in the image capturing apparatus according to an embodiment of the present disclosure.

Next, an operation of an image generation circuit of the present embodiment will be described with reference to a flowchart shown in FIG. 8.

An image having a Bayer structure, which is an output image from the CMOS sensor, is input into the camera signal processing circuit 3 (S1000). Thereafter, the interpolation processing is performed on an interpolated image for each pixel by using peripheral pixels, and then an interpolated image is generated (S1001).

The color matrix operation for adjusting color is performed on the generated interpolated image (S1002).

Next, the scan reverse mode included in the image capturing apparatus is selected and whether or not an image reverse operation is ON is determined (S1003). When it is determined that the scan reverse mode is OFF, interpolation pixels whose color signals match the color signals of each pixel corresponding to the Bayer image of the CMOS sensor are selected from the interpolated image and image data is output to the memory I/F unit (S1004).

On the other hand, when it is determined that the scan reverse mode is ON, interpolation pixels whose color signals are different from the color signals of each pixel corresponding to the Bayer image of the CMOS sensor are selected from the interpolated image and image data is output to the memory I/F unit (S1005).

The memory I/F unit reverses the image on the basis of information indicating the direction of the reverse operation in the scan reverse mode and stores the image data in the SDRAM for buffering an image (S1006).

Next, the image data is read from the SDRAM which stores the image data while re-arranging the signals so that the image data is compliant with the SMPTE standard (S1007).

The color signal of the first pixel (upper left pixel) of the image data in the currently selected scan reverse mode is superimposed on an ancillary area of the read image data as the camera metadata. The signals are converted into signals compliant with the 3G-SDI standard which is the output standard, and then the signals are output from an output terminal (S1008).

As described above, when the scan reverse mode ON, for example, the left/right reverse is selected for the color signal of the first pixel of the Bayer image selected by the Bayer image generation unit, an interpolated color signal whose color corresponds to the color signal of the last pixel in the horizontal direction when the scan reverse mode is OFF is selected.

When the up/down reverse is selected, an interpolated color signal whose color corresponds to the color signal of the last pixel in the vertical direction when the scan reverse mode is OFF is selected.

When the up/down/left/right reverse is selected, an interpolated color signal whose color corresponds to the color signal of the last pixel at the lower right of the image when the scan reverse mode is OFF is selected.

The color signal of the first pixel of the Bayer image when each scan reverse mode (up/down, left/right, or up/down/left/right) is selected is switched and superimposed as the metadata included in the image data.

Thereby, when the image data is read from the frame memory, even if the image is reversed, it is possible to match the color of the color signal of the first pixel of the Bayer image before being reversed with that of the Bayer image after being reversed.

Second Embodiment

In the first embodiment, a configuration has been described in which, in the selection operation of the interpolation pixels when generating the Bayer image, the color signal of the first pixel is changed with respect to when the scan reverse mode is OFF, and then the scan reverse is performed.

In the second embodiment, the method in which the camera signal processing circuit performs the interpolation processing on the Bayer image and generates an interpolated image is the same as that of the first embodiment.

A configuration in which, in the following operation, the interpolated image is reversed on the basis of reverse information in the scan reverse, and thereafter the Bayer image is generated will be described with reference to FIG. 7.

Figure 7:
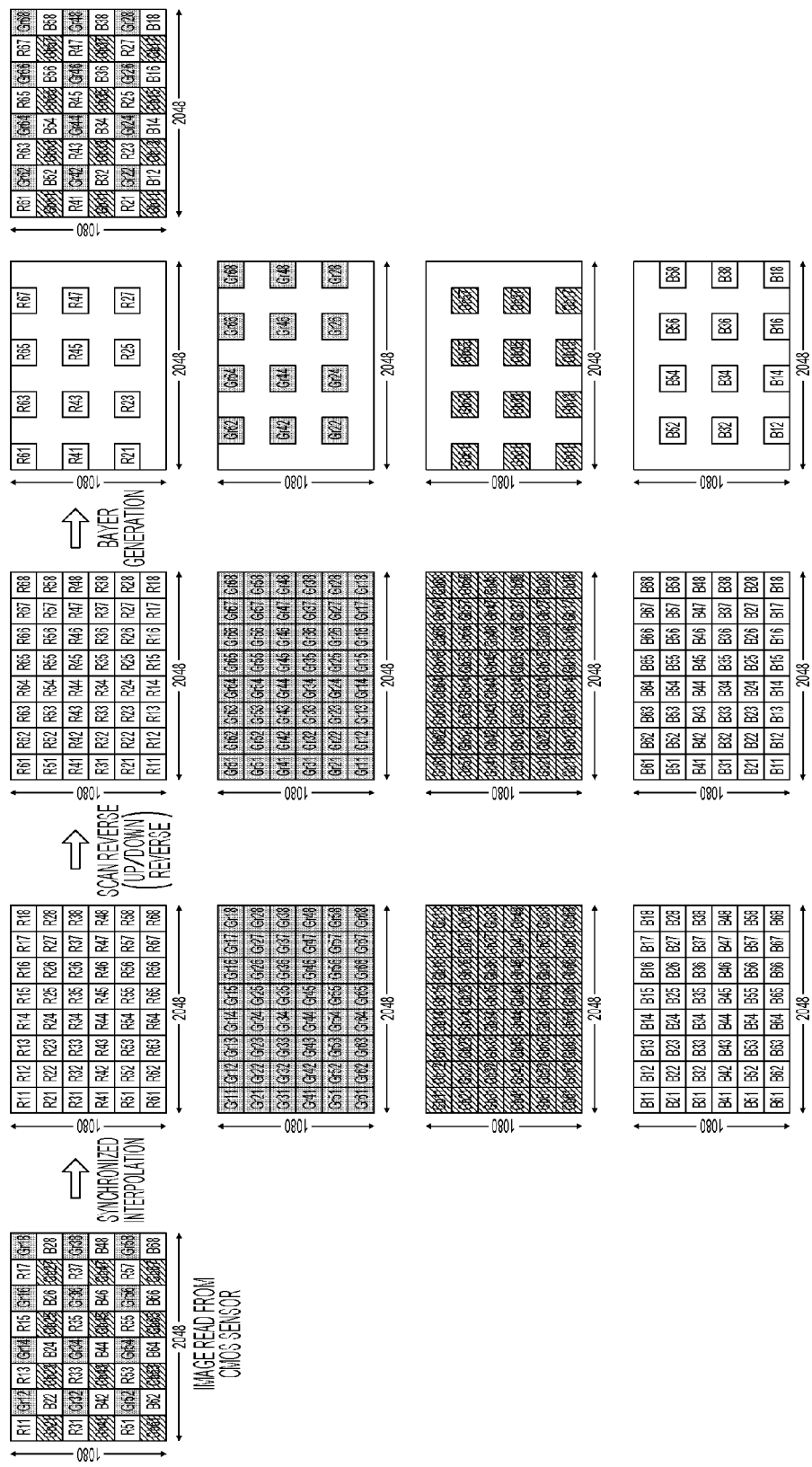
FIG. 7 is a diagram of an example of Bayer image generation after "scan reverse" in the image capturing apparatus according to an embodiment of the present disclosure.

FIG. 7 is an example of the up/down reverse of an image, which is one of the scan reverse modes.

As shown in FIG. 7, the interpolated image after the color matrix operating circuit 103 is each of R/Gr/Gb/B plane images (size: 2048 horizontal×1080 vertical).

Each interpolation image is reversed vertically by using a memory.

An example will be described using the interpolated image "R". Before the interpolated image "R" is reversed vertically, the upper left pixel is "R11" and the lower right pixel is "R68".

After the interpolated image "R" is reversed vertically by the up/down reverse operation of the scan reverse mode, the upper left pixel is "R61" and the lower right pixel is "R18".

A selection operation is performed from the interpolated images generated by the up/down reverse operation so that the color of the color signal of the first pixel (upper left pixel) corresponds to that of the Bayer image before the interpolation processing.

In the case of the interpolated image "R", the upper left pixel is "R61" and the lower right pixel is "not selected".

Therefore, the selected addresses of the interpolated image "R" are odd addresses in the horizontal direction and odd addresses in the vertical direction.

This operation is performed on each interpolated image, so that the selected addresses of the interpolated image "Gr" are even addresses in the horizontal direction and odd addresses in the vertical direction and the selected addresses of the interpolated image "Gb" are odd addresses in the horizontal direction and even addresses in the vertical direction.

The selected addresses of the interpolated image "B" are even addresses in the horizontal direction and even addresses in the vertical direction.

After the selection operation is performed, the processed images are written to the SDRAM as the image data through the memory I/F unit.

Thereby, in the image written to the SDRAM, the upper left pixel is "R61" and the lower right pixel is "B18". Therefore, although the image is a Bayer image obtained by vertically reversing the Bayer image before the interpolation processing, the color signal of the first pixel (upper left pixel) of the image is "R" which is the same as the color of the color signal of the first pixel of the Bayer image before the interpolation processing.

In this way, the Bayer generation is performed so that, after the interpolated image obtained by performing the interpolation processing on the Bayer image is vertically reversed, colors of the color signals of the pixels of the reversed image correspond to those of the Bayer image before the interpolation processing. Thereby, it is possible to match the color signal of the first pixel of an image after the scan reverse with that of the image before the scan reverse while realizing the scan reverse.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a CPU, micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-089691, filed Apr. 10, 2012, which is hereby incorporated by reference herein in its entirety.

What is claimed is:

1. An image processing apparatus comprising:
a generation unit configured to perform interpolation processing on a first image in which a plurality of colors is arranged in a predetermined order and generate a second image in which colors are arranged in an order reverse to the predetermined order from an interpolated image;
a memory configured to store the second image; and
a reversing unit configured to reverse the second image when reading the second image from the memory.

2. The image processing apparatus according to claim 1, wherein
the generation unit generates the second image by using only information of pixels newly generated by the interpolation processing.

3. The image processing apparatus according to claim 1, wherein
the generation unit changes pixels selected from the interpolated image when generating the second image according to a direction of a reverse operation.

4. The image processing apparatus according to claim 1, wherein
the first image and the second image are images of Bayer pattern.

5. The image processing apparatus according to claim 4, wherein
color signals of first pixels of a Bayer pattern image before and after reversing the Bayer pattern image are superimposed on metadata of image data.

6. An image processing apparatus comprising:
an interpolation unit configured to generate an interpolated image by performing interpolation processing on a first image in which a plurality of colors is arranged in a predetermined order;
a memory configured to store the interpolated image;
a reversing unit configured to reverse the interpolated image when reading the interpolated image from the memory; and
a generation unit configured to generate a second image in which colors are arranged in an order reverse to the predetermined order from the interpolated image reversed by the reversing unit.

7. The image processing apparatus according to claim 6, wherein
the generation unit changes pixels selected from the interpolated image when generating the second image according to a direction of a reverse operation.

8. The image processing apparatus according to claim 6, wherein
the first image and the second image are images of Bayer pattern.

9. An image capturing apparatus comprising:
an image capturing unit configured to generate a first image in which a plurality of colors is arranged in a predetermined order;
a generation unit configured to perform interpolation processing on the first image and generate a second image in which colors are arranged in an order reverse to the predetermined order from an interpolated image;
a memory configured to store the second image; and
a reversing unit configured to reverse the second image when reading the second image from the memory.

10. An image capturing apparatus comprising:
an image capturing unit configured to generate a first image in which a plurality of colors is arranged in a predetermined order;
an interpolation unit configured to generate an interpolated image by performing interpolation processing on the first image;
a memory configured to store the interpolated image;
a reversing unit configured to reverse the interpolated image when reading the interpolated image from the memory; and
a generation unit configured to generate a second image in which colors are arranged in an order reverse to the predetermined order from the interpolated image reversed by the reversing unit.

11. An image processing method comprising:
performing interpolation processing on a first image in which a plurality of colors is arranged in a predetermined order and generating a second image in which colors are arranged in an order reverse to the predetermined order from an interpolated image;
storing the second image in a memory; and
reversing the second image when reading the second image from the memory.

12. An image processing method comprising:
generating an interpolated image by performing interpolation processing on a first image in which a plurality of colors is arranged in a predetermined order;
storing the interpolated image in a memory;
reversing the interpolated image when reading the interpolated image from the memory; and
generating a second image in which colors are arranged in an order reverse to the predetermined order from the reversed interpolated image.

* * * * *